US006488970B1

(12) United States Patent
Hora

(10) Patent No.: US 6,488,970 B1
(45) Date of Patent: Dec. 3, 2002

(54) PET FOOD SUPPLEMENT

(75) Inventor: Roland Hora, Kaufbeuren (DE)

(73) Assignee: DOGURT Nauheltenvertrieb GmbH, Kaufbeuren (DE)

( * ) Notice: Subject to any disclaimer, the term of this patent is extended or adjusted under 35 U.S.C. 154(b) by 0 days.

(21) Appl. No.: 09/580,298

(22) Filed: May 26, 2000

(30) Foreign Application Priority Data

May 3, 2000 (DE) .......................... 100 21 384

(51) Int. Cl.⁷ ........................... A23L 1/30; A23L 1/302; A23L 1/304
(52) U.S. Cl. ............................ 426/72; 426/74; 426/34; 426/36; 426/42; 426/48; 426/580; 426/805
(58) Field of Search .............................. 426/34, 36, 48, 426/42, 580, 805, 72, 74

(56) References Cited

U.S. PATENT DOCUMENTS 5,538,743 A * 7/1996 Heinemann et al. .......... 426/42
5,759,598 A * 6/1998 Gaier .......................... 426/34

* cited by examiner

*Primary Examiner*—Helen Pratt
(74) *Attorney, Agent, or Firm*—Levisohn, Lerner, Berger & Langsam, LLP

(57) ABSTRACT

An animal food product useful as food supplement for pets such as dogs or cats, comprising a carrier and at least one food additive selected from vitamins, provitamins, minerals and trace elements, whereby the carrier comprises a cultured milk product.

20 Claims, No Drawings

PET FOOD SUPPLEMENT

The present invention relates to an animal food product useful as food supplement for pets such as dogs or cats. In particular, the present invention relates to a pet food supplement comprising a specific carrier and one or more food additives selected from vitamins, provitamins, minerals and trace elements. Moreover, the present invention relates to a process for the preparation of the food product and to specific uses of the food product.

Pets such as dogs and cats are most often fed with processed pet food products. The use of processed pet food products is problematic. In case mainly processed pet food products are fed it is likely that the diet of the pet will give rise to health problems. Such health problems may be due to the presence of ingredients having a negative effect on the digestion of the animal or due to the lack of certain vitamins, provitamins, amino acids, minerals or trace elements essential for restoring, preserving or improving the health of the animal. Health problems which may be associated with the consumption of processed pet food products are diarrhea, congestion, flatulence, lack of appetite, vomiting, loss of hair, unspecific itching of the skin, or skin diseases.

Therefore, it is desirable to supplement the diet of a pet in order to prevent or retract health problems or to improve the health and well-being of the pet. A food supplement is even more desirable in the light of the fact that pets such as cats and dogs are frequently kept inside the home of the respective pet owner. In the domestic environment, pets may become a burden in case of health problems due to the difficulties of keeping the domestic environment clean when the pets are ill. Specifically, in case of diarrhea, vomiting, and loss of hair the pet will likely cause damage in the domestic environment by polluting carpeting and upholstery. In case of flatulence and skin disease, the smell of the pet may become a burden in the domestic environment. Moreover, any health problems experienced by the pet will be likely to lead to undesireable behavioral changes of the pet.

Any pet food product including pet food supplements must meet in combination a number of different requirements to be commercially useful.

The food product must have a smell and flavor which render the food acceptable to the animal. In case smell or flavor are not acceptable for a specific animal, the animal will refuse to consume the food product. It is known to add flavoring agents as well as aroma and flavor enhancers to pet food products. However, a general acceptance among dogs or cats cannot be achieved with known substances. Usually, the acceptance of a common dry dog food product is in the order of 70%. In any case, it must be borne in mind that food products may not contain sugar as a flavoring agent in amounts which will lead to severe conditions such as blindness. Food additives such as certain vitamins to be administered to a pet may present an unacceptable taste to the pet. Therefore, it is often difficult to administer such food additives by simple admixing to the regular pet food since the unacceptable taste or smell cannot be efficiently masked by the regular pet food. In particular, the administration of food additives in high concentrations is problematic.

Animal food products must not have undesired effects on the health of the animal. In particular, the food product must not have adverse effects on the digestion of the animal such as causing congestion or diarrhea. In case such undesired effects on the digestion are observed, additional measures will be necessary in order to retract or avoid such undesired effects.

The food product must have an acceptable shelf life at room temperature since animal food products are sold in supermarkets in a designated pet food department which usually does not offer the possibility of cooling the merchandise. For the animal food products to be useful it is necessary that it may be stored for at least three months at room temperature without spoiling. Preferably, the shelf life is obtainable without the use of any preservative.

In case food additives are administered to a pet, the dosage of such food additives must be easy to control, in particular in cases where an overdosing with potentially harmful substances may lead to adverse effects on the health of the pet.

Accordingly, it is a problem for the present invention to provide an animal food product useful as a pet food supplement which
  (i) enjoys high acceptance with pets,
  (ii) has beneficial effect on the digestion of the animal,
  (iii) has a shelf life without use of preservatives or cooling of several months, and which
  (iv) provides the possibility for a simple and safe dosage of any food additive contained in the food supplement.

A further problem of the invention is to provide a process for the preparation of an animal food product useful as a pet food supplement which has the above properties (i) to (iv).

A still further problem of the invention is to provide the use of the animal food product of the invention in pet food and as a pet food supplement.

DISCLOSURE OF THE INVENTION

These problems are solved according to claim 1 with an animal food product useful as food supplement for pets such as dogs or cats, comprising a carrier and at least one food additive selected from vitamins, provitamins, minerals and trace elements, whereby the carrier comprises a cultured milk product.

The present invention provides a wet food product comprising a carrier and at least one specific food additive. It was found that surprisingly an animal food product containing food additives and having a very high acceptance with animals such as dogs and cats, may be prepared by using a specific wet carrier. The carrier is a cultured (fermented) milk product prepared from milk having a fat content of up to 2.5% by weight, preferably up to 2% by weight.

The present invention also provides a process for the preparation of an animal food product comprising the steps of adding at least one food additive selected from the group of vitamins and provitamins, minerals, and trace elements to milk having a fat content of up to 2.5% by weight, fermenting the mixture in the presence of a microorganism, and heating the mixture to an elevated temperature for a predetermined period of time to a predetermined temperature for essentially terminating the fermentation.

It is essential that the respective food additives are added to the milk prior to the fermentation whereby the food additives may be effectively dissolved or dispersed in the milk and the shelf-life and acceptability of the product of the invention become superior. The specific reasons for the observed effects are presently not understood in detail. However, it is contemplated that the food additives will be at least partially incorporated into microorganisms or bonded to the microorganisms used for culturing during the fermentation process or to ingredients of the milk. Thereby, the taste and smell of the food additives is effectively masked and the desireable milk character in the taste and smell of the product is preserved. Moreover, it is contemplated that the incorporation or bonding of the food additives to the microorganisms or ingredients of the milk leads to a desireable slow release of the incorporated or bonded food additives in the digestive system of the animal.

The food product of the invention comprising a cultured milk product as a carrier has highly beneficial effects on the digestion of the animal whereby undesired side effects from the use of conventional processed animal food may be avoided, retracted and the digestion of the animals may even be improved.

The shelf-life of the animal food product is provided by heating the animal food product to a predetermined temperature for a predetermined time for essentially terminating the fermentation process and by storing the animal food product under essentially sterile conditions. The food product of the invention may be stored in packaged form without cooling or the use of preservatives, preferably for at least six month. Thus, the pet food product of the invention may be stored or offered in places which do not provide cooling for pet supplies, such as supermarkets or pet supply stores. Moreover, the food product of the invention does not have to be kept in a refrigerator by the pet owner. Thus, the animal food product may be kept separate from the food for human beings. Hence, undesirable confusion between food for humans and animals may be avoided.

The fermentation process used to prepare the animal food product of the invention provides a product having a viscous consistency which can easily be handled, wherein the food additives are well dispersed and any undesireable taste of a food supplement is effectively masked by a taste having a milk character preferred by pets. The use of the specific carrier of the invention allows to provide easy and predetermined dosage of the food additives based on the amount of the food product fed to the animal.

The shelf-life of the animal food product of the invention may be further extended by adding to the animal food product any preservatives conventionally used for preserving milk and dairy products.

The invention further provides the use of the animal food product of the invention in pet food and as a pet food supplement.

DETAILED DESCRIPTION OF THE INVENTION

The animal food product of the invention comprises a carrier and at least one food additive.

The carrier is a cultured (fermented) milk product. The cultured milk product is a milk product prepared from partially skimmed milk, skim milk or reconstituted non-fat dry milk. Preferably, the milk is cow milk. It is essential that the fat content. in the milk used for the carrier of the animal food product of the invention is up to 2.5% by weight, preferably up to 2% by weight and more preferably about 1.5% by weight. If the amount of fat is above this range, the animal will be likely to suffer from diarrhea when ingesting the animal food product of the invention.

The milk product may be a product fermented with one or more bacterial cultures used in the art as starters for the preparation of cultured milk products. Specific examples of the starters are *Lactobacillus bulgaricus, Streptococcus thermophilus, Streptococcus lactis, Streptococcus diacetilactis, Leuconostoc citrovorum, Lactobacillus acidophilus, Lactobacillus bifidus, Lactobacillus caucasieus*.

In a preferred embodiment, the cultured milk product used as a carrier according to the present invention is a yogurt. The yogurt is preferably made by fermenting milk with Lactobacillus bulgaricus and Streptococcus thermophilus. The yogurt may be a set type yogurt which is filled immediately after the inoculation with bulk starter and incubated in the packages. The yogurt may also be a stirred type yogurt which is inoculated and incubated in a tank. After incubation the product is filled in packages. The heating for providing the shelf-life may be carried out before or after filling the product into the packages. In case the product is heated before filling, care must be taken during the filling operation in order to avoid contamination of the product whereby the shelf-life is deteriorated. Preferably, the product of the invention is a set type yogurt.

The consistency of the cultured milk product used as carrier according to the invention may range from a thin or creamy product to a gelatinous or firm pudding-like product depending on the preferences of the pet owner and the pet.

The animal food product according to the invention contains at least one food additive in an amount higher than the natural content or proportion of this food additive in the milk used for the preparation of the carrier. A food additive is a substance with nutritive and other dietary effects. Specifically, the food additive of the invention is selected from vitamins and provitamins, minerals and trace elements. In a preferred embodiment, the animal food product contains a mineral such as calcium and at least one vitamin or provitamin.

Any water soluble or fat soluble vitamins and provitamins are suitable for use in the animal food product of the invention. Examples for vitamins useful as food additives according to the present inventions are vitamin A, B1, B2, B6, B12, C, D, E, H (biotin), K, carotene, folic acid, inositol, niacin, and pantothenic acid. Preferred vitamins are vitamins A, D3, E, B6 and biotin. According to the most preferred embodiment of the invention these preferred vitamins are used in combination. Vitamin A is needed by pets for maintaining visual senses as well as healthy mucous membranes. Vitamin A deficiency results in skin diseases and in an increased susceptibility to infections. Vitamin A may be contained in the product of the invention in an amount of from 100 to 20,000, preferably 5,000 to 15,000, more preferably about 14,000 IU/kg of the fermented milk in the product.

Vitamin D3 stimulates the absorption from the bowel of calcium and phosphorous compounds, which are essential for the formation of the skeleton. Vitamin D3 may be contained in an amount of from 100 to 3,000, preferably 1,000 to 2,000, more preferably about 1,500 IU/kg of the fermented milk in the product.

Vitamins A and D must be controlled in order to avoid hypervitaminosis caused by the storage of these vitamins by the body of the animal.

Vitamin E is an anti-oxidant necessary for maintaining cell membranes and normal enzyme functionality. In case of vitamin E deficiency, cardiac and skeletal muscles degenerate, the physical development is disturbed and optomeninx degeneration is observed. Vitamin E is contained preferably in an amount of from 10 to 250 mg/kg, more preferably about 50 mg/kg of the fermented milk in the product.

Vitamin B6 (pyridoxal, pyridoxamine, pyridoxine) is essential for numerous reactions in the amino acid metabolism. Vitamin B6 deficiency results in a loss of weight and anemia of the animal. Vitamin B6 is contained preferably in an amount of from 2 to 20 mg/kg, more preferably about 12 mg/kg of the fermented milk in the product.

Biotin is essential for the carbohydrate, fat and protein metabolism. Biotin deficiency results in dermatitis as well as discoloration and loss of hair. Biotin is contained preferably in an amount of from 100 to 800 µg/kg, more preferably about 460 µg/kg of the fermented milk in the product.

Minerals and trace elements suitable for the animal food product of the invention are in particular calcium, magnesium, copper, zinc, and iron salts.

The animal food product of the present invention may further contain additives commonly known in the art in an amount which does not impair the purpose and effect provided by the invention. Examples of such additives are bulking agents, substances with a stabilizing effect, organoleptic substances, and processing aids.

Examples of bulking agents optionally contained in the animal food product of the invention are water, air, crystalline cellulose, or polydextrose.

Substances with a stabilizing effect may be added to increase the shelf life of the product of the invention by supplementing or reinforcing the effect of the physical methods used for increasing the shelf life according to the invention. Examples of substances with a stabilizing effect optionally contained in the animal food product of the invention are preservatives, antioxidants, synergists and sequestrants, packaging gases, stabilizers, emulsifiers, thickeners, gelling agents, and humectants. Examples for the emulsifiers and/or thickening agents are gelatine, cellulose ethers, starch, starch esters, starch ethers, modified starches, with modified starches being preferred.

Organoleptic substances may be used to stimulate the appetite of the pet by improving the product of the invention in view of appearance, taste, smell, and aroma. Such substances may be used to influence positively the senses of smell, taste, and vision before, during or after the consumption of the product by the animal. Examples of organoleptic substances optionally contained in the animal food product of the invention are coloring agents, color stabilizers, acidulants, substances with a salty taste, substances with a bitter taste, substances with an alkaline taste, flavor enhancers, spices and flavorings. A flavoring agent or an aroma or flavor enhancer may be added to the animal food product of the invention in particular when the animal food product is used in cat food.

Processing aids may be used to fulfill a certain technological purpose during treatment or processing. Examples of processing aids besides bacterial cultures which are optionally contained in the animal food product of the invention are enzymes and acidity regulators.

The process for the preparation of an animal food product according to the present invention comprises the steps of adding food additives selected from the group of vitamins and provitamins, minerals, and trace elements to milk having a fat content of up to 2.5% by weight, fermenting the mixture in the presence of a microorganism, and heating the mixture to an elevated temperature for a predetermined period of time to a predetermined temperature for essentially terminating the fermentation.

Now a preferred process for the preparation of the animal food product of the invention is described.

Food additives are added in the desired amounts to standardized milk having a content of fat of up to 2.5% by weight. The mixture is mixed whereby the food additives are thoroughly dissolved or dispersed in the milk. Optionally, standardization of the milk may be carried out after the food additives were added whereby the solids content is adjusted in order to improve the structure of the finished product. Any other optional component such as emulsifiers and thickening agents may also be added at that stage.

The water content of the mixture is adjusted to provide a cultured milk product having a water content of at least 70% by weight, preferably at least 80% by weight.

Preferably, the mixture is then subjected to a thermal treatment and/or homogenization.

The thermal treatment may comprise thermization, pasteurization, sterilization or ultrahigh temperature heating for the purpose of the destruction of microorganisms and the provision of physicochemical changes such as inactivation of enzymes, denaturation of whey proteins, activation of sulfhydryl groups, and liberation of hydrogen sulfide, and the Maillard reaction between protein and lactose. However, it must be kept in mind that thermal treatment of the milk may destroy vitamins. Therefore, excess amounts of thermally labile vitamins may be used to account for any loss during thermal treatment of the milk. Moreover, the process conditions may be adjusted to minimize any loss of vitamins.

Homogenization may be used for providing a uniform fat distribution, a whiter color, a fuller taste, and a softer coagulum on clotting and consequently a better digestability of the animal food product of the invention. When homogenization is applied, the average particle size of the fat globules is reduced to below 2 µm, preferably below 1 µm.

Subsequently, starter cultures are added to the mixture. The starter cultures may be liquid or freeze-dried starting cultures according to common practice in the art.

In a first preferred embodiment, the mixture is then filled into packages and sealed under essentially sterile conditions. The package may be any package capable of being heated to a temperature for a predetermined time for essentially terminating the cultivation of the mixture. Preferably a plastic package such as a plastic cup having a functional coating on the inner wall is employed. Such functional coating as known in the art should not be detrimental to the mixture and the food product in a temperature range of from −50° C. to 100° C. The plastic cup may be sealed with a metal or plastic foil according to methods generally known in the art.

The packaged mixture is then incubated preferably at a temperature of about 40 to 45° C. for 1 day for fermentation of the mixture whereby the pH of the mixture is lowered in a range of pH 3.9 to 4.5.

After culturing, the packaged mixture is heated to elevated temperatures for essentially terminating the fermentation. Preferably, the packaged mixture is heated to a temperature of from 60 to 75° C., preferably to about 70° C. for a period of 1 to 10 minutes, preferably for about 4 minutes. The thermal treatment increases the shelf life of the final product to more than three month. Finally, the packaged product is cooled in order to provide an animal food product of the invention.

In a second preferred embodiment, the mixture is then kept in a fermenter. The mixture is incubated in the fermenter preferably at a temperature of about 40 to 45° C. for 1 day for fermentation of the mixture whereby the pH of the mixture is lowered in a range of from pH 3.9 to 4.5.

Subsequently, the fermented mixture is filled into packages under essentially sterile conditions. The package may be the same as in the first preferred embodiment.

After filling the fermented mixture into packages, the packaged mixture is heated to elevated temperatures for essentially terminating the fermentation. Preferably, the packaged mixture is heated to a temperature of from 60 to 75° C., preferably to about 70° C. for a period of 1 to 10 minutes, preferably for about 4 minutes. The thermal treatment increases the shelf life of the final product to more than three month, typically to at least six month. Finally, the packaged product is cooled in order to provide an animal food product of the invention.

In the process for preparing an animal food product of the invention it is essential that the food additives selected from vitamins, provitamins, minerals and trace elements are added to the milk prior to fermentation. In case the food additives are added after fermentation, the shelf life of the product will deteriorate. Moreover, the presence of the food additives during fermentation will lead to the incorporation of the food additives in the microorganisms used for fermentation whereby any unacceptable flavor or smell of the food additives may be effectively hidden. Further, an excellent dissolution or dispersion of the food additives within the cultured milk product may be obtained.

The animal food product may contain any food additives in any desired amount as long as the dosage is high enough to provide a desired effect and provided that the dosage is low enough to avoid an impairment of the purpose or effect of the invention.

Usually, the food additives are dosed and administered to an animal based on the amount of the animal food product depending on the type, sex, weight, health, and age of the specific animal and the frequency of administration.

The food additives in the animal food product of the invention may be administered in admixture with the regular animal food or as a separate feed. The animal food product may have any temperature when administered to the animal. Usually room temperature is preferred. However, the administration of the animal food product of the invention as a frozen yogurt type product is contemplated.

Vitamin A may be administered to a pet by using the animal food product of the invention in an amount of from 100 to 20,000, preferably 1,000 to 15,000, more preferably about 1,700 to about 12,000, most preferably about 3400 IU per week.

Vitamin D3 may be administered to a pet by using the animal food product of the invention in an amount of from 100 to 3,000, preferably about 160 to about 1,100, more preferably about 320 IU per week.

Vitamin E may be administered to a pet by using the animal food product of the invention in an amount of from 10 to 250, preferably 12 to 100, more preferably about 14 to about 96, most preferably about 28 mg per week.

Vitamin B6 may be administered to a pet by using the animal food product of the invention in an amount of from 0.5 to 20, preferably 1 to 8, more preferably about 2.3 mg per week.

Biotin may be administered to a pet by using the animal food product of the invention in an amount of from 100 to 800, preferably 58 to 400, more preferably about 115 μg per week.

Calcium may be administered to a pet by using the animal food product of the invention in an amount of from 100 to 1,000, preferably about 140 to 950, more preferably about 250 mg per week.

The above ranges refer to an adult dog having a body weight of about 8 to 10 kg. The dosage may be adapted in case of a deviation of the body weight, maturation or type of a specific animal. In particular, problems associated with hypervitaminosis should be avoided by the adjustment of the dosage.

In the most preferred embodiment, an animal food product having a predetermined composition may be packaged in cups containing the product in an amount of 125 g per cup. Such cups may be fed in an amount of from 1 to 7 cups per animal per week. The composition of the product should be adjusted so that the weekly dosage administered to the animal is within the preferred ranges given above. Accordingly, the dosage and administration of the animal food product of the invention is easy and reliable in particular for elderly pet owners.

Now the invention will be described with reference to specific examples.

EXAMPLE 1

Cow milk was standardized by adjusting the fat content to 1.4% by weight, thermal treatment and cooling followed by adding the following food additives so that the mixture contained 0.11% by weight of calcium and the following amounts of vitamins per kg:

| | |
|---|---|
| Vitamin A | 13,500 IU |
| Vitamin D3 | 1,300 IU |
| Vitamin E | 110 mg |
| Vitamin B6 | 9.1 mg |
| Biotin H | 460 μg | as well as small amounts of modified starch and gelatine.

Subsequently, the mixture was homogenized, thermally treated and cooled.

Subsequently, a starter culture containing *Lactobacillus bulgaricus* and *Streptococcus thermophilus* in a weight ratio of 1:1 was added to the mixture as starter cultures for incubation.

Subsequently, the mixture was packaged under sterile conditions in containers adapted to be heated at elevated temperature. The containers were covered and sealed with aluminum foil. The sealed containers were then thermally treated at about 40 to 45° C. for 1 day for fermentation. Subsequently, the packaged product was heated to 70° C. for 4 minutes followed by cooling to 10°C.

The final product was analyzed and the content of the following components was determined (% means % by weight):

| | |
|---|---|
| protein: | 3.5%, |
| fat: | 1.4%, |
| ash: | 0.8%, |
| fiber: | 0.1%, |
| calcium: | 0.11% |
| and water | 86% |

The product had a shelf life of at least six months without cooling and without the presence of any preservatives.

TEST EXAMPLE

The product of Example 1 was fed as a food supplement for a period of three weeks to a group of 18 dogs of various breeds and sizes. Each dog was fed with one container containing 125 g per day of the product of Example 1 together with the regular processed food. As a result, the acceptance of the animal food product of the invention turned out to be 90%. Moreover, it was observed that the dogs fed with the product of Example 1 did not show any digestive problems indicative of malnutrition. Digestion was not disturbed by flatulence and diarrhea, feces did not have a foul odor and the volume and consistency of bowel evacuation were not impaired. In four dogs, the yogurt of Example 1 mixed with normal food even stimulated the animals' appetite. All dogs fed with the yogurt of Example 1 were lively, agile and had a glossy and supple coat.

The regular feeding of the yogurt of Example 1 reveals, due to its composition, positive impact on the animal's skeleton, muscles, nervous stimulation, digestion, mucous membranes, skin, and coat.

What is claimed is:

1. A process for the preparation of a shelf-stable food supplement for pets, the ingredients for said food supplement consisting essentially of a food additive, wherein said food additive consisting essentially of at least one food additive selected from vitamins, provitamins, minerals and trace elements, and a cultured milk product serving as a wet carrier, said food supplement used in addition to a regular pet diet, said process comprising the steps of
   (i) adding food additives selected from the group consisting of vitamins, provitamins, minerals and trace elements to a wet carrier which is a milk product,
   (ii) fermenting the mixture in the presence of a microorganism, and
   (iii) heating the mixture to an elevated temperature for a predetermined period of time to a predetermined temperature to essentially terminate the fermentation.

2. The process of claim 1, wherein said milk product has a fat content of up to approximately 2.5% by weight.

3. The process according to claim 2, wherein the microorganism is a mixture of *Lactobacillus bulgaricus* and *Streptococcus thermophilus*.

4. The process according to claim 3, wherein the food additives comprise calcium, vitamin A, vitamin D3, vitamin E, vitamin B6 and :biotin.

5. The process according to claim 2, wherein the food additives comprise calcium, vitamin A, vitamin D3, vitamin E, vitamin B6 and biotin.

6. The process according to claim 2, wherein the fat content of the milk is at most 1.5% by weight.

7. The process according to claim 1 wherein the microorganism is a mixture of *Lactobacillus bulgaricus* and *Streptococcus thermophilus*.

8. The process according to claim 7, wherein the fat content of the milk is at most 1.5% by weight.

9. The animal food product according to claim 8, wherein said cultured milk product has a fat content of up to 2.5% by weight.

10. A pet food supplement consisting essentially of a food additive, wherein said food additive consisting essentially of the group cosisting of comprises essentially of least one food additive selected from the group consisting of vitamins, provitamins, minerals and trace elements, and a cultured milk product serving as a wet carrier, said pet food supplement being shelf stable for non-refrigerated shelf life storage.

11. The animal food product according to claim 10, characterized in that the cultured milk product is a yogurt.

12. The animal food product according to claim 11, wherein the food additives comprise calcium, vitamin A, vitamin D3, vitamin E, vitamin B6 and biotin.

13. The animal food product according to claim 11, wherein the food additives per kg of the food product comprise:

| | |
|---|---|
| Vitamin A | 13,500 IU per kg; |
| Vitamin D3 | 1,300 IU per kg; |
| Vitamin E | II O mg per kg; |
| Vitamin B6 | 9.1% per kg, |
| Biotin | 460 pg per kg. |

14. The animal food product according to claim 13, wherein said food product has a shelf life at room temperature of more than 3 months.

15. The animal food product according to claim 11, further comprising a flavoring agent to alter the flavor of said animal food product.

16. The animal food product according to claim 11, wherein said food product has a shelf life at room temperature of more than 3 months.

17. The animal food product according to claim 10 wherein the food additives comprise calcium, vitamin A, vitamin D3, vitamin E, vitamin B6 and biotin.

18. The animal food product according to claim 17, wherein said food product has a shelf life at room temperature of more than 3 months.

19. The animal food product according to claim 10, further comprising a flavoring agent to alter the flavor of said animal food product.

20. A pet food product as set forth in claim 10, wherein said pet food supplement consisting essentially of substantially non-meat products.

* * * * *

UNITED STATES PATENT AND TRADEMARK OFFICE
CERTIFICATE OF CORRECTION

PATENT NO. : 6,488,970 B1
DATED : December 3, 2002
INVENTOR(S) : Roland Hora

It is certified that error appears in the above-identified patent and that said Letters Patent is hereby corrected as shown below:

<u>Title page,</u>
Item [73], the name of the Assignee should be corrected to read
-- DOGURT Neuheltenvertrieb GmbH --.

Signed and Sealed this

Fifteenth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,488,970 B1
DATED          : December 3, 2002
INVENTOR(S)    : Roland Hora It is certified that error appears in the above-identified patent and that said Letters Patent is hereby corrected as shown below:

<u>Title page,</u>
Item [73], the name of the Assignee should be corrected to read
-- DOGURT Neuheitenvertrieb GmbH --.

This certificate supersedes Certificate of Correction issued April 15, 2003.

Signed and Sealed this

Nineteenth Day of August, 2003

JAMES E. ROGAN
*Director of the United States Patent and Trademark Office*